United States Patent [19]
Gondek

[11] Patent Number: 5,836,747
[45] Date of Patent: Nov. 17, 1998

[54] VARIABLE VOLUME AIR PUMP

[76] Inventor: John T. Gondek, 1641 Innsbruck Cir. W., Columbia Heights, Minn. 55421

[21] Appl. No.: 489,977

[22] Filed: Jun. 13, 1995

[51] Int. Cl.$^6$ ..................................................... F04B 19/00
[52] U.S. Cl. ........................................... 417/63; 417/470
[58] Field of Search ......................... 417/63, 415, 410.3, 417/470

[56] References Cited

U.S. PATENT DOCUMENTS

| | | | |
|---|---|---|---|
| 2,029,941 | 2/1936 | Pokorney | 417/470 |
| 2,564,173 | 8/1951 | Rappl et al. | 417/470 |
| 3,163,355 | 12/1964 | Korte | 417/470 |
| 3,186,349 | 6/1965 | Compton et al. | 417/470 |

OTHER PUBLICATIONS

Stoelting model 219 Mix Pump Owner's Manual No. 1134067. Revised Jun., 1985 (31 pages).
Hajec handwritten memorandum dated Aug. 2, 1993.
Stoelting P.O. 16069–00 dated Aug. 4, 1993 to Vikeland ordering 10 ice cream mix and air pump per Jul. 8, 1996 B. GOCH requirement memo with .100" wall.
Falcon Electric Corp. Aug. 10, 1993 letter.
Falcon Electric Corp. Aug. 12, 1993 letter.
Vikeland (Kletch) Sep. 2, 1993 memorandum to Hajec (2 pages).
Stoelting Dec. 22, 1993 trip report (7pages).
Stoelting PO81180–00 dated Mar. 7, 1994 for 50 U3 Ultima Pumps.
Stoelting May 5, 1994 letter to Chet Hajec (Vikeland).
Hajec May 16, 1994 letter to Stoelting.
Stoelting May 23, 1994 letter to Chet Hajec (Vikeland).
Stoelting Oct. 4, 1994 letter to Chet Hajec (2pages).
Stoelting Oct. 14, 1994 memorandum (4 pages).
Stoelting Nov. 30, 1994 letter to Chet Hajec.
Stoelting Jan. 5, 1995 memorandum (3 pages).
Stoelting PO 88009–00 dated Jan. 26, 1995.
Stoelting PO 88011–00 dated Jan. 26, 1995.
Stoelting Feb. 27, 1995 memorandum (2 pages).
Stoelting Mar. 16, 1995 memorandum (3 pages).
Stoelting Mar. 29, 1995 letter to Chet Hajec (2 pages).
Stoelting Apr. 4, 1995 letter to Falcon Electric.
Stoelting Apr. 17, 1995 letter to Falcon Electric.
Stoelting May 9, 1995 letter to Falcon Electric (5 pages).
Stoeling May 17, 1995 letter to Falcon Electric (2 pages).
Stoelting May 18, 1995 letter to B. Linnerooth (Falcon Electric) (3 pages).
Chester S. Hajec Declaration.

*Primary Examiner*—Timothy Thorpe
*Assistant Examiner*—Peter G. Kurytnyk
*Attorney, Agent, or Firm*—Roger W. Jensen

[57] ABSTRACT

A constant-speed, variable-volume, piston-type air pump. The piston head always is closely adjacent to the cylinder head at the completion of the compression stroke. The length or extent of the piston down-stroke or intake stroke is selectively adjustable between a maximum and a minimum position to thus vary the volume of air pumped.

16 Claims, 7 Drawing Sheets

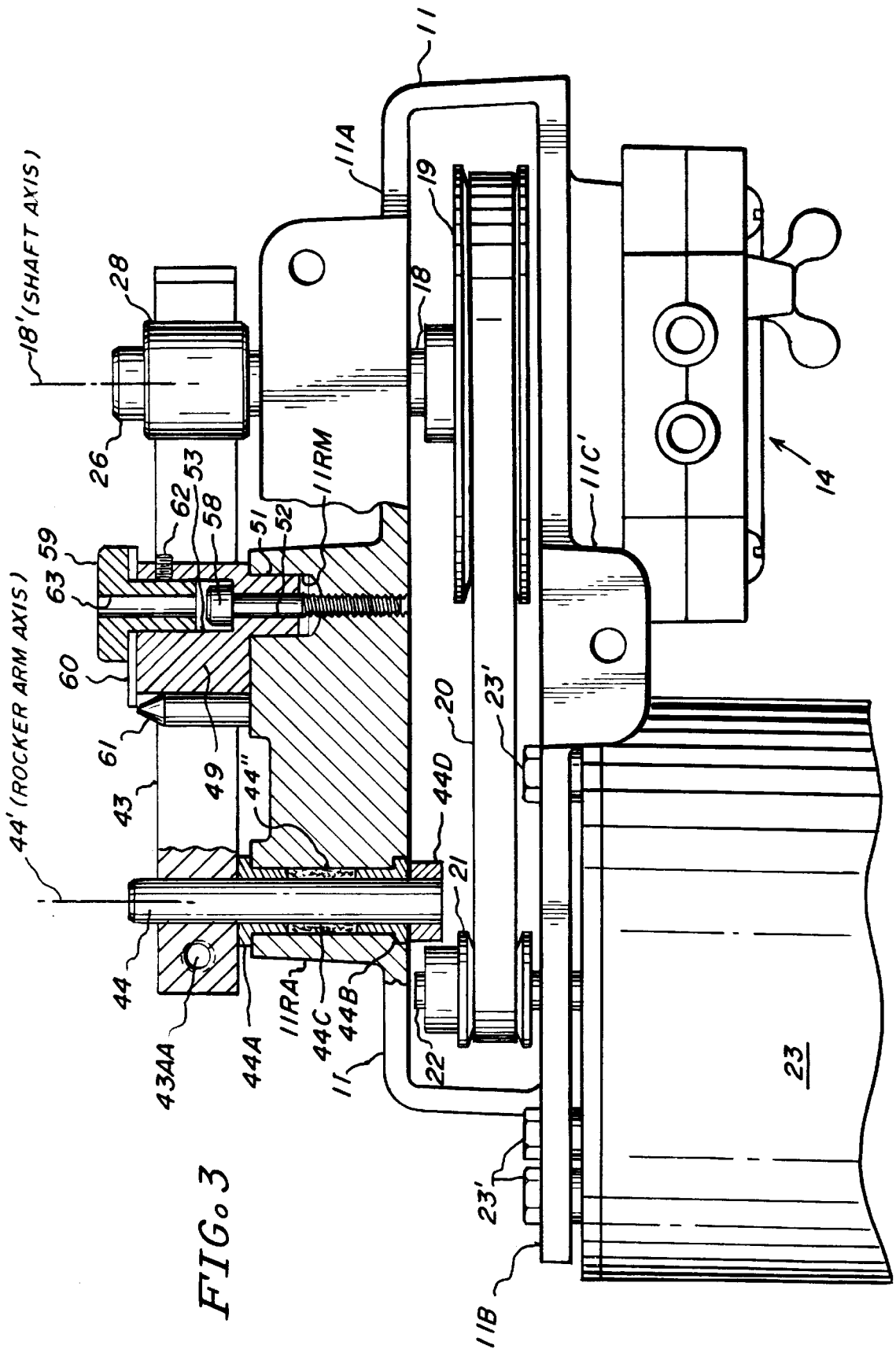

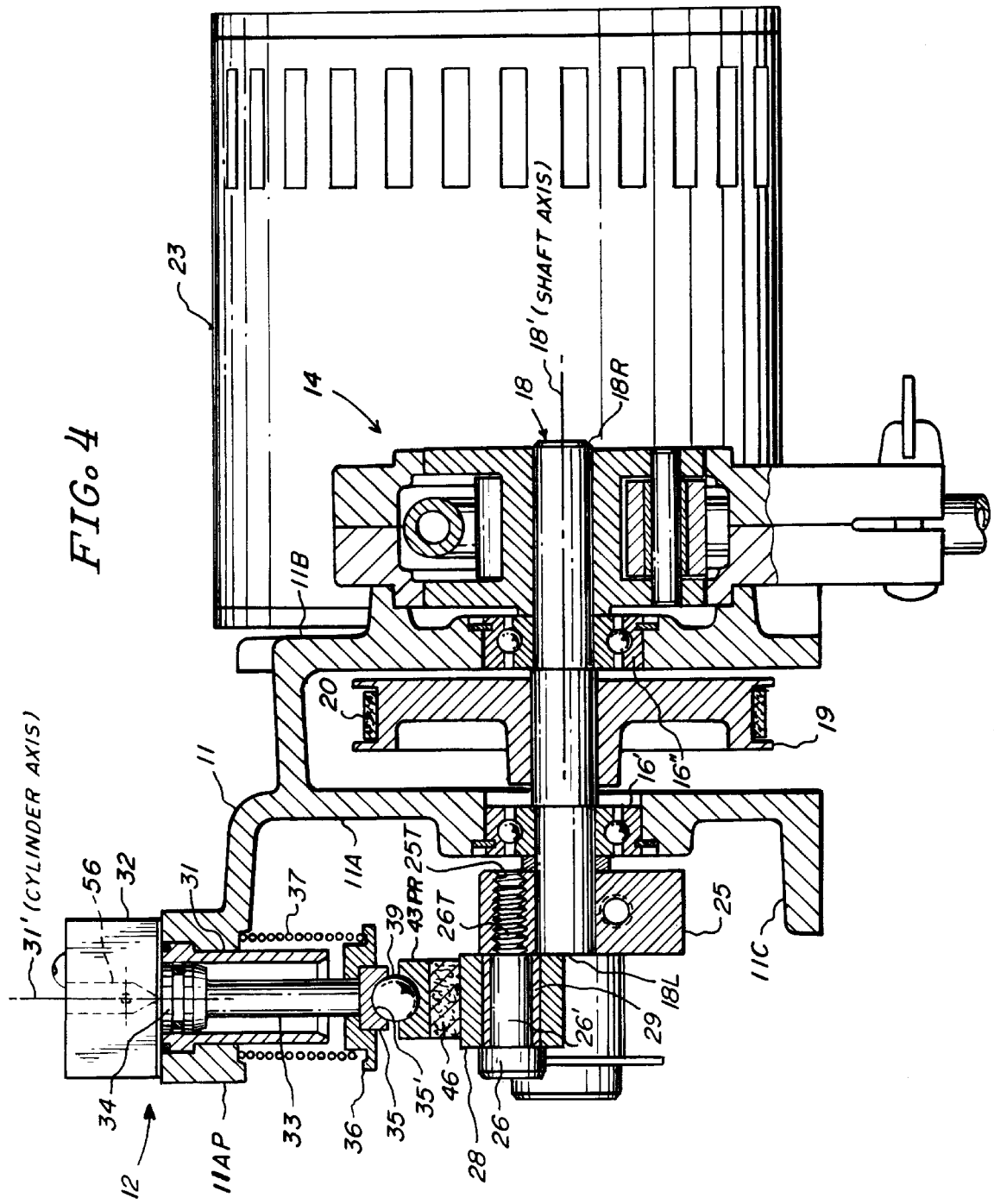

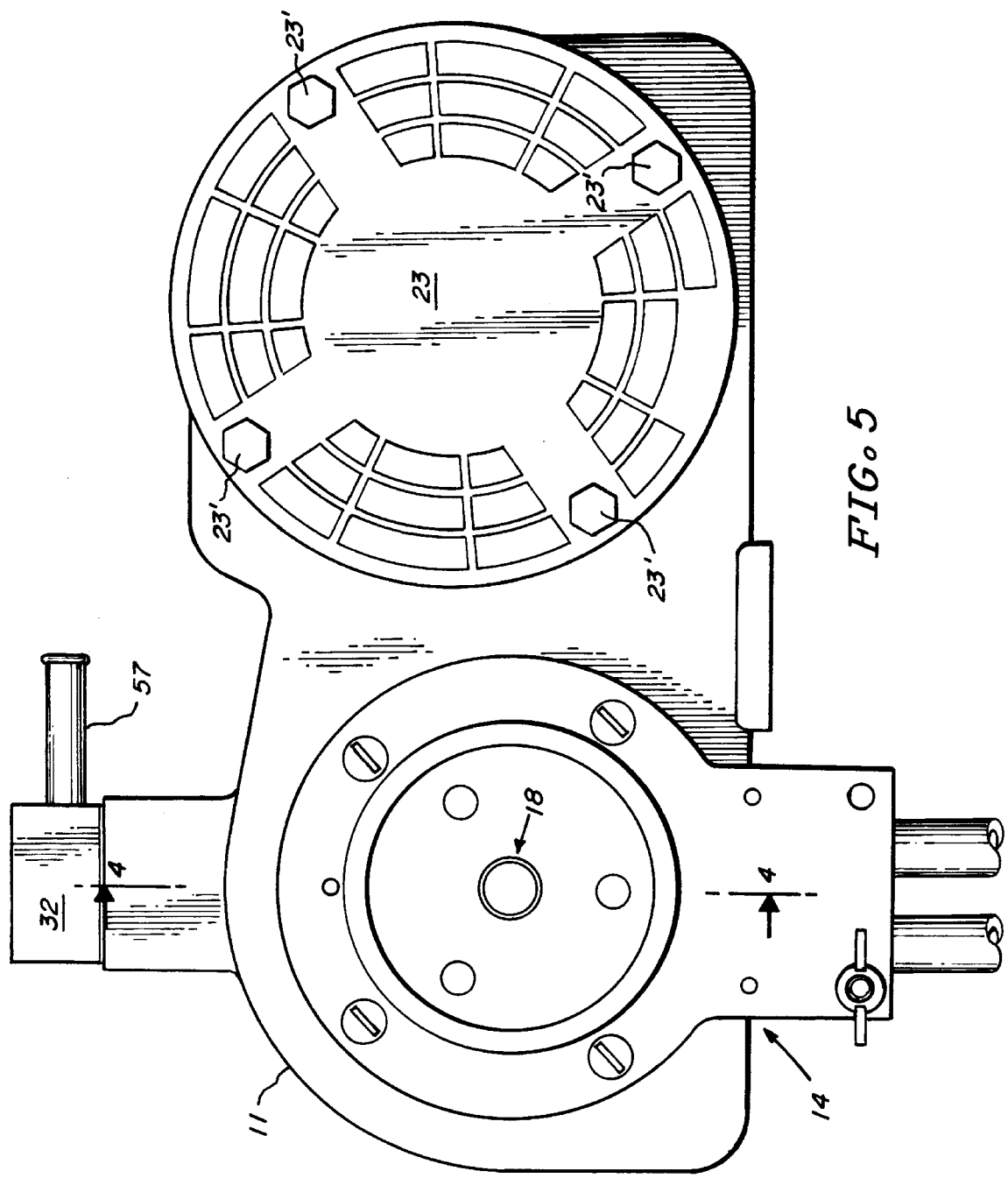

VARIABLE VOLUME AIR PUMP

CROSS REFERENCES TO RELATED APPLICATIONS

This application is related to two applications filed by the applicant concurrently with this application, i.e., Ser. No. 08/489,978 entitled "*Peristalic Pump*" and Ser. No. 08/490,091 entitled "*Combined Variable Volume Air Pump And Peristalic Pump*" both now allowed.

BACKGROUND OF THE INVENTION

In the field of pumps for pumping air or other gas, it is of course old in the art to vary the volume of the air or gas pumped by varying the speed of the pump; for example, the frequency of reciprocation of a piston in a cylinder. In general, the faster the speed or frequency the greater the volume of air pumped. It is also known to vary the amount of air or gas pumped by varying the length of the stroke of a piston in its associated cylinder; an example of the foregoing is the manually operated bicycle tire pump where the operator can easily vary the length of the stroke from a maximum length stroke to a very short stroke.

In the field of "soft" ice cream machines, air pumps are used to supply air that is combined with liquid ice cream mix to yield an air/liquid mixture. The liquid ice-cream mix is typically supplied at a constant rate by a suitable pump such as a constant speed peristalic pump. The air and the liquid ice-cream mix are combined in a mixer means such as a "T" connection and the resultant air/liquid mixture is pumped to a freezer-storage tank unit where the mixture is stored under pressure and the temperature of the mixture is reduced to a pre-selected point; the mixture then may be selectively dispensed into soft ice cream cones or other containers for customer consumption. It is very important to have accurate control of the ratio of air to liquid in the mixture to control the quality, i.e., the "taste" of the soft ice cream and to provide a compressible air-liquid ice cream mixture so that the mixture can be stored under pressure in the freezer-storage tank unit. The prior air pumps used in soft ice cream machines have not been fully satisfactory. Additional information is helpful in understanding the shortcomings of the prior art air pumps. It is important to have the air-liquid ice cream mixture under pressure in the freezer tank unit (as aforesaid) so that the pumps only be intermittently operated, i.e., continuous operation of the pumps is not desirable. A typical prior art system has a tank pressure sensor switching means which initiates pumping action at 17 psi±3 psi (above atmospheric pressure) and which stops the pumping at 23 psi±3 psi. Also, at initial start up, the freezer tank is empty and at atmospheric pressure. For example, one prior art variable volume air piston-type pump is characterized by having a significant variable clearance between the top of the piston head (when at maximum compression stroke) and the cylinder head. Thus there will be air remaining in the cylinder after the piston has completed its compression stroke; this creates a major problem because of the above described "system" characteristics. To explain, upon initial start up of both the air pump and peristalic pump, since there is no tank "back pressure" for the air pump to work against, the air pump, on the first compression stroke, will deliver a very large volume of air greatly in excess of the desired amount for the desired ratio of air to liquid. Each successive compression stroke contributes (on a diminishing basis) to the incorrect ratio of air to liquid. For this type of air pump there is only one tank pressure at which the desired air/liquid mix ratio is achieved. Thus there is a problem upon initial start up and the problem continues after the tank is full as the system cycles between the low pressure start and high pressure stop as described above. Further, when the aforesaid prior art pump is subjected to a variation in atmospheric pressure, the air flow rate will vary because of the expansion or contraction of the air gap between the top of the piston and the cylinder head.

Prior art air pumps without the above noted clearance are known; however, such pumps are not variable volume when driven at constant speed. The present invention provides a variable volume, air pump that is especially well suited for soft ice cream machine applications, i.e., avoids the above described prior art pump problem.

SUMMARY OF THE INVENTION

The present invention is related to pumps that are driven by a prime mover such as an electric motor. Further, the present invention is directed to pumps used in applications where it is mandatory, when the pump is operating, that the pump be driven at a constant speed; an example of the foregoing is the application described in considerable detail in the above mentioned co-pending application of applicant, entitled "*Combined Variable Volume Air Pump And Peristalic Pump.*" The present invention is further directed to a more specific application wherein, in addition to the requirement of constant speed, it is also mandatory to have means for adjusting the volume of air pumped by the pump over a substantial range of volumes without any sacrifice of pumping efficiency or other disadvantages. Specifically, the present invention provides a constant speed, variable volume, piston-type pump wherein the piston pushes substantially all the air out of the cylinder on the compression stroke before the beginning of the piston in-take stroke.

The present invention may as summarized by an air pump having a frame and a shaft rotatably supported by the frame for rotation about a shaft axis and means for rotating the shaft such as a constant speed electric motor. A crank arm is fixed to the shaft so as to rotate therewith. The frame also supports a pump cylinder having a cylinder head and a cylinder body depending therefrom along a cylinder axis or center line that is perpendicular to the shaft axis. The invention further includes an elongated piston rod having a piston head at one end that is positioned in the cylinder for relative reciprocation therewith. The piston head is adapted to be moved (after the completion of the compression stroke) between a compression position at which point the top of the piston head is immediately adjacent to the cylinder head and (after the completion of the intake stroke) a second position whereat the piston head is displaced away from the cylinder head by a pre-selected distance. The piston rod has at its other end means for receiving force tending to move the piston head toward the cylinder head. Piston spring means are connected between the frame and the piston rod for biasing the piston head away from the cylinder head. One of the unique features of the invention is a piston rod engagement means (i) rotatably mounted on the frame, (ii) positioned to engage the other end of the piston rod, and (iii) further being positioned so as to be contacted by the crank arm. The invention further includes adjusting means for selectively varying the extent of rotation of the piston rod engagement means away from the cylinder head to thereby vary the intake-stroke travel of the piston rod (and thus to vary the volume of air admitted to the pump). The pump further includes check valve means adapted to admit air into the cylinder when the piston head moves away from the cylinder head during the intake stroke and to prevent airflow therethrough when the piston head moves toward the cylinder head during the compression stroke. Also provided are pump outlet check valve and port means connected to, and integral with, the cylinder head end for transmitting air under pressure to a load or air utilization apparatus. The outlet check valve permits air to exit the cylinder during the compression stroke but prevents back flow from the "load" during the intake stroke. The foregoing apparatus functions by shaft rotation causing contact by the crank arm with the piston rod engagement means to thereby periodically move the piston rod engagement means towards the cylinder head and thereby transmit force from the piston rod engagement means to the piston rod to thereby periodically move the piston head toward the cylinder head against the biasing force of the spring to thereby compress air in the cylinder. Further, the adjusting means can be adjusted to pre-select the extent of the piston intake stroke to thereby adjust the volume of air admitted into the cylinder when the piston head moves away from the cylinder head during the piston intake stroke and thus vary the volume or flow rate of air pumped by the pump during the compression stroke.

In the preferred embodiment of the invention, the piston rod engagement means takes the form of a rocker arm which is pivotally mounted on the frame for rotation about an axis parallel to the shaft axis. Further, in the preferred embodiment, the adjusting means takes the form of an eccentric means rotatably mounted on the frame in a position to be in engagement with the rocker arm so as to limit the movement of the rocker arm away from the cylinder head to thus provide an adjustable limit for the intake stroke of the piston rod. The adjusting means further includes means for selectively locking the eccentric means to the frame at any one of a large plurality of pre-selected angular positions about its rotational axis to thereby have respective pre-selected portions of said eccentric means engages the rocker arm to thereby limit the rotation of the rocker arm away from the cylinder to any one of a plurality of pre-selected positions and in turn to thereby limit the intake stroke of the piston rod to a plurality of pre-selected positions. This, of course, will in turn adjust the volume of air admitted into the cylinder when the piston head moves away from the cylinder head during the piston intake stroke and thus vary the volume of air pumped by said pump during the pump compression stroke.

It is an object of this invention to provide a variable volume, air pump of improved construction and operation. Other objects and various advantages of the invention will become apparent to those skilled in the art from the following description taken in connection with the accompanying drawings.

DESCRIPTION OF THE DRAWINGS

FIG. 3 is a bottom view, partly in section, of the apparatus;

FIG. 4 is a vertical cross-section of the pump showing the piston rod and piston head at the completion of the compression stroke as viewed along section line 4—4 of FIG. 5;

FIG. 5 is a right side view of the apparatus;

DESCRIPTION OF PREFERRED EMBODIMENT

Figure 1:
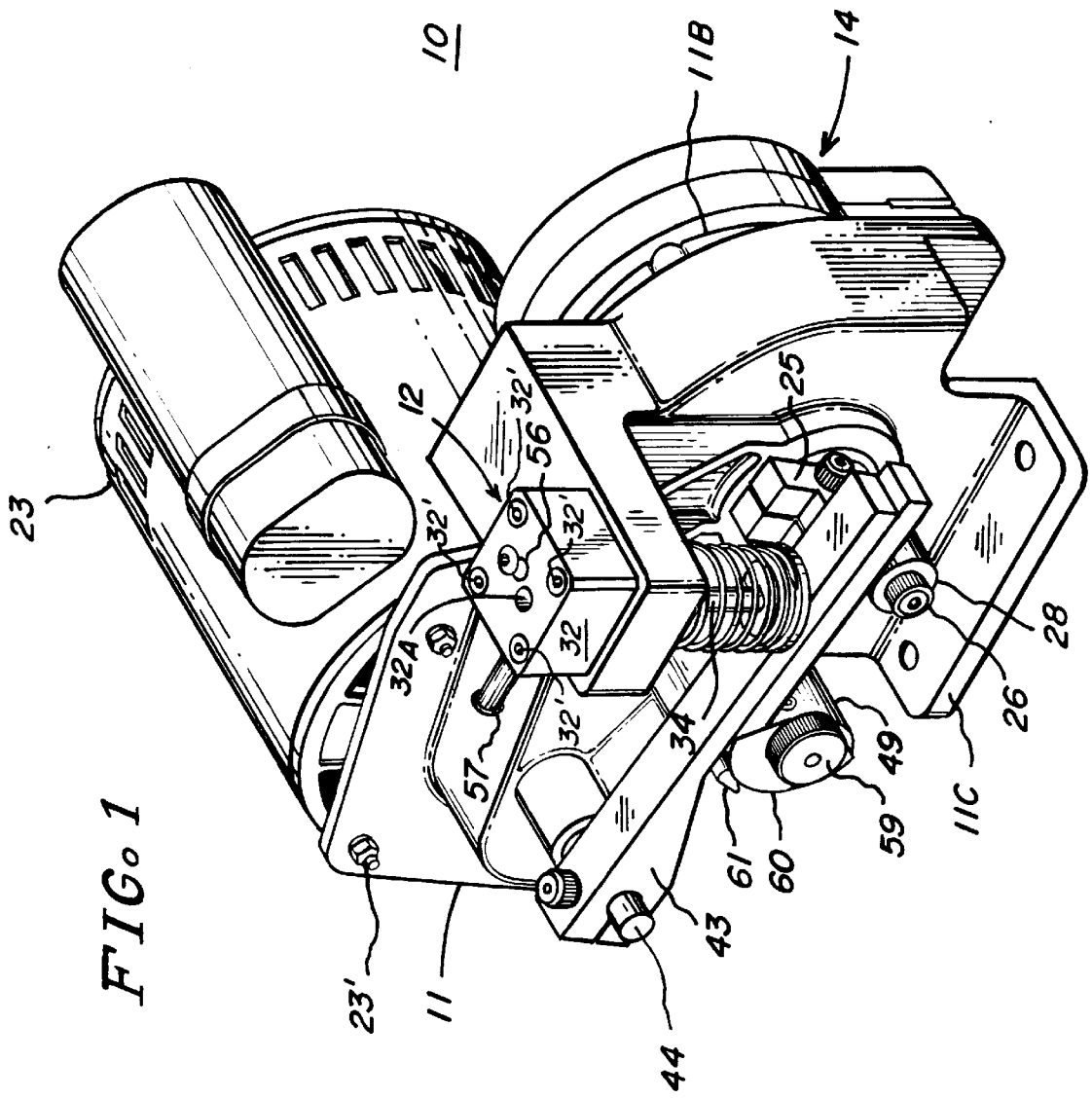
FIG. 1 is an isometric view of the improved pump in combination with other apparatus which are the subject matter of said co-pending applications.

Referring to FIG. 1, reference numeral 10 designates a combined air pump 12 and peristalic pump 14 both mounted on the same common frame 11. The peristalic pump 14 is the subject matter of a the above mentioned patent application entitled "*Peristalic Pump.*" The entire apparatus/depicted in FIG. 1 is the subject matter of applicant's other co-pending application entitled "*Variable Volume Air Pump and Peristalic Pump*".

A portion of frame 11 is shown in cross-section in FIG. 4 comprising a pair of spaced-apart parallel wall portions 11A and 11B. A first pedestal or mounting foot 11C is provided at the bottom of wall portion 11A as depicted in FIGS. 1 and 4. Centrally positioned in wall frame portions 11A and 11B are a pair of ball bearings 16' and 16" respectively which support a shaft 18 for rotation about a shaft axis 18'. Means for rotating the shaft 18 include a large pulley 19 fixed to shaft 18 and positioned between portions 11A and 11B of the frame. A pulley belt 20 engages the operative driving surface of pulley 19 and extends to engage with a smaller pulley 21 shown in FIG. 3 and fixed to a shaft 22 of a motor 23 which in turn is attached to frame wall portion 11B by suitable fastening means 23'. In the preferred embodiment, motor means 23 is a single phase, AC electric motor which, when energized, will drive shaft 22 at a constant angular velocity and thus, through the pulley 21, belt 20 and pulley 19 drive the shaft 18 at a slower but constant angular velocity. A second pedestal or mounting foot 11C' is integral with frame wall portion 11B (see FIG. 3)

Referring to FIG. 4 the left end of shaft 18 is identified by reference 18L and has attached thereto a crank arm 25 which rotates unitarily with shaft 18 and supports a crank comprising a shoulder screw 26 having a threaded portion 26T screwed into a threaded hole 25T in the crank arm 25. A smooth shank portion 26' of shoulder screw 26 supports for rotation therewith a roller 28, a bearing means 29 interposed between shank portion 26' and roller 28 facilitating the free rotation of roller 28 about the axis defined by the shoulder screw 26. Thus rotation of shaft 18 rotates crank arm 25 and roller 28 attached thereto, as aforesaid.

A portion 11AP of frame 11 shown in the upper left hand portion of FIG. 4 supports a pump cylinder 31. A cylinder head 32 is aligned with cylinder 31 and is attached to the frame portion by suitable means such as machine screws 32' shown in FIG. 1. The pump cylinder is depicted as being a hollow cylindrical tubular member held in a bore in the frame portion 11AP and depending therefrom along a cylinder axis or center line 31' perpendicular to the shaft axis 18'.

Figure 6:
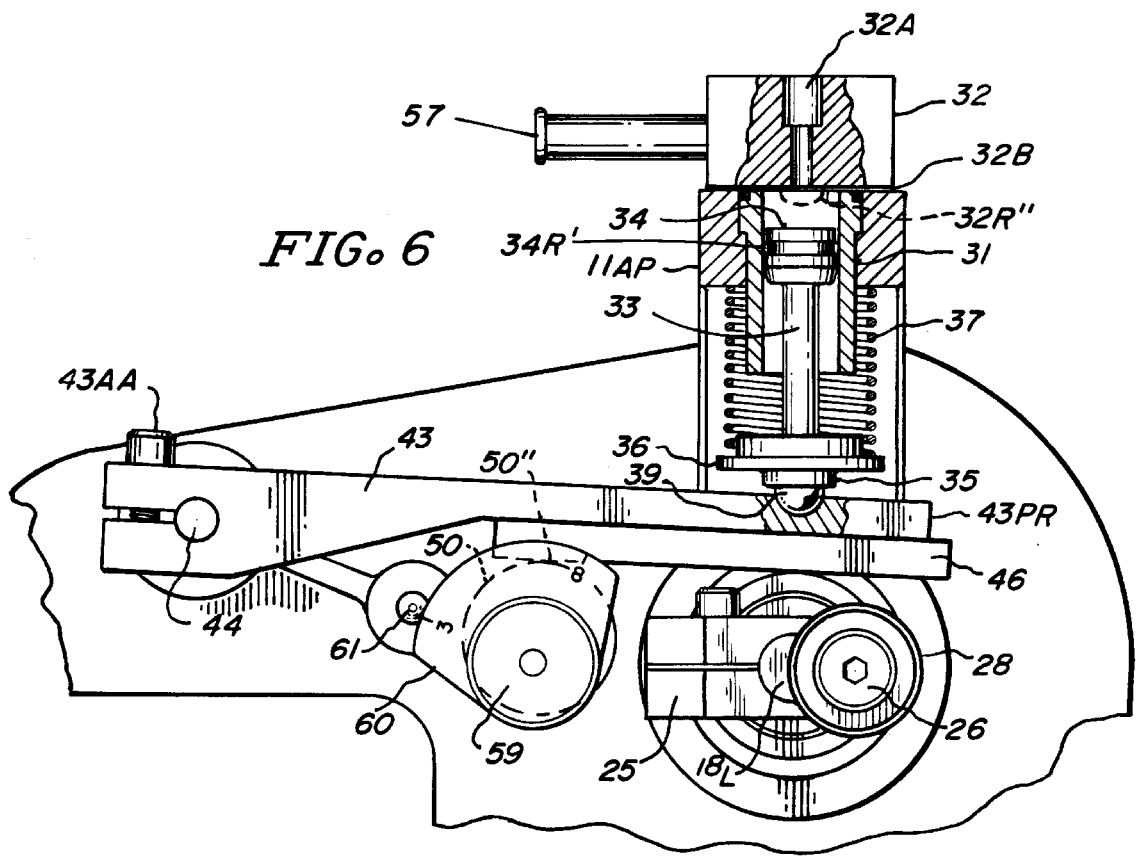
FIG. 6 is a partial left side view showing the rocker arm being held by the eccentric means in a position different from that shown in FIG. 2.

An elongated piston rod 33 having a piston head 34 (with piston "O" ring 34R and GLYD ring 34R', see FIG. 7) at one end thereof is positioned within cylinder 31 for relative reciprocation therewith. In FIG. 4 the top surface of piston head 34 is shown immediately adjacent to cylinder head 32, this is the position of the piston head when the piston rod is moved to the completion of the compression stroke. In FIG. 6, the piston head is shown displaced downwardly or away from the cylinder head, i.e., at the completion of the intake stroke. The other end 35 of the piston rod 33 has two functions. The first function is to support a spring seat 36 which in turns co-acts with a coil spring 37 positioned between the spring seat 36 and the frame portion 11AP and functions to bias the spring seat and the end 35 of the piston rod so that the piston head 34 is biased away from the cylinder head 32.

The second function of end 35 of the piston rod is to provide a means for receiving force tending to move the piston head toward the cylinder head. More specifically, end 35 has a spherical recess 35' (see FIG. 4) for receiving a portion of the spherical periphery of a ball bearing ball 39.

Figure 2:
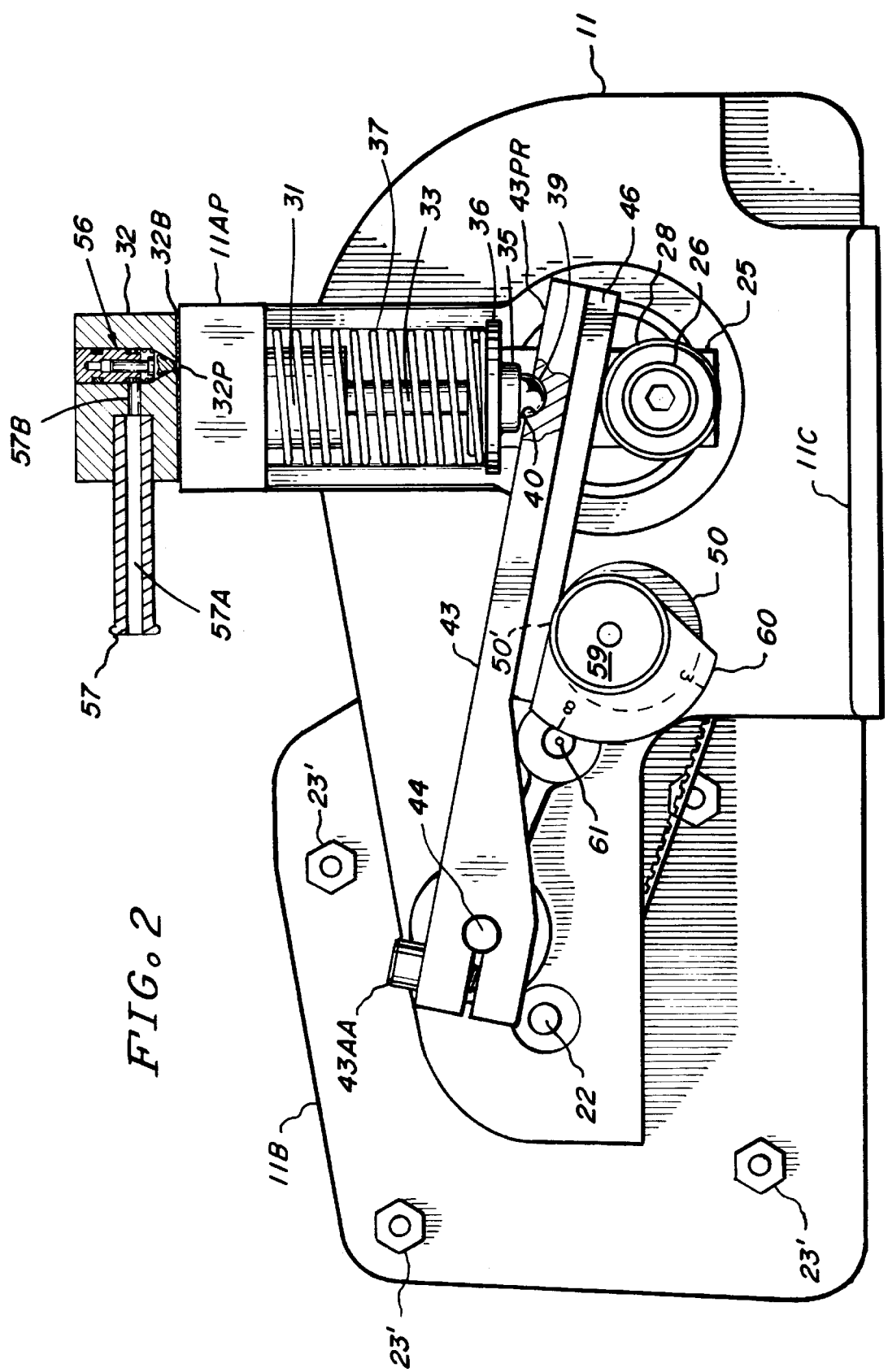
FIG. 2 is a left side view, partly in section, of the improved apparatus.

The invention further includes a piston rod engagement means shown, in FIGS. 2 and 6, as a rocker arm 43 connected and locked by screw means 43AA to a shaft 44 for limited rotation about a shaft axis 44' (see FIG. 3), the shaft 44 being rotatably supported by a pair of bushings 44A and 44B positioned at opposite ends of a bore 44" in portion 11RA of the frame 11. A lubricant impregnated felt 44C is placed between bushings 44A and 44B for lubrication thereof. A collar 44D attached by a press fit to shaft 44 adjacent to bushing 44B as shown in FIG. 3 holds the assembled shaft 44 and rocker arm 43 in the position shown in FIG. 3. As shown in FIG. 3, the rocker arm axis 44' is parallel to, but spaced from the shaft axis 18'.

The rocker arm 43 has a significant longitudinal length which permits the rocker arm to be positioned to engage the other end 35 of the piston rod. See, for example, FIG. 2. The end of the rocker arm which engages the end 35 of the piston rod is designated in FIGS. 2 and 4 by reference numeral 43PR and more specifically a suitable spherical, cup-like recess 40 is provided in end 43PR for co-acting with the ball 39.

Thus the rocker arm 43 is pivotally mounted on the frame. Further, the rocker arm is positioned to engage the other end of the piston rod whereby the rocker arm is biased by the force of the spring bias means 37 to move away from the cylinder head 32. Further, the rocker arm is positioned so as to be periodically contacted by the roller 28 carried by the crank arm 25. The rocker arm 43 is made from any suitable rigid material such as aluminum and the roller 28 also would be made out of a suitable material such as aluminum. To provide a shock absorption means to reduce shock and noise upon impact of the roller 28 with the bottom surface of the rocker arm 43, a shock pad 46 or an appropriate resilient material is bonded to the underside of the rocker arm 43. Thus the roller 28 periodically contacts the shock pad 46.

The invention further includes an adjusting means for selectively varying the extent of movement of the piston rod engagement means away from the cylinder head to thereby vary the length of the intake stroke travel of the piston rod. More specifically, the adjusting means in the preferred embodiment is shown as an eccentric means 49 shown in detail in FIGS. 2, 3 and 6 to include a circular surface or periphery 50 and a stepped bore 52,53 (see FIG. 3) defining an axis which is eccentric to the surface 50. The lowest and highest points of the surface 50 from the axis are identified by reference numerals 50' and 50", and shown, respectively, in FIGS. 2 and 6. The eccentric 49 further includes a hub portion 51 concentric with the axis. Referring to FIG. 3, a bore 11RM is provided in frame 11 and is adapted to receive the hub 51 of the eccentric 49. The fit of the hub 51 in recess 11RM is intended to be snug and yet permit relative rotation of the eccentric means within the bore 11RM. Separate means are provided for locking the eccentric means about its rotational axis. As depicted, the locking means comprises a socket head screw 58 adapted to be inserted through bore 52 with the screw head contained within bore 53 and a threaded end portion of the screw adapted to engage a threaded recess in frame 11 as is clearly shown in FIG. 3. The adjustment means further includes a knob 59 having a smooth shank adapted to be positioned within bore 53 and to be held in position therewith by a setscrew 62. The knob 59 has a bore 63 therethrough to permit the insertion of a torque producing means such as a hex wrench to engage the head of screw 58. Also an index 60 (see FIGS. 2, 3 and 6) is positioned between knob 59 and is bonded to the eccentric 49 to rotate unitarily with the eccentric 49 about its axis, the index 60 co-acting with a pointer 61 attached to the frame 11 to provide a visual indication of the position of the eccentric 49.

The adjusting means as shown in FIG. 2 has the eccentric means 49 rotated about its axis so that the "lowest" point 50' of surface 50 is engaging the underside of shock pad 46 so as to permit the maximum travel of rocker arm 43 away from the cylinder 31. In this configuration the piston has a maximum of intake travel. FIG. 6 shows the eccentric 49 rotated so that the "highest" point 50" of cam surface 50 is engaging the underside of shock pad 46 so that the rocker arm 43 is positioned substantially closer to the cylinder head 32 as compared to the position shown in FIG. 2. Thus, in the FIG. 6 configuration, the piston rod would have a minimum amount of intake travel. It will be understood that the eccentric 49 may be designed to yield the desired preselected maximum and minimum down-stroke positions of the piston rod 33.

Figure 9:
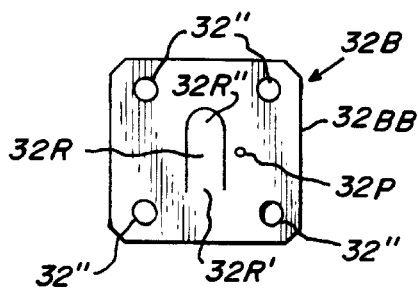
FIGS. 9 and 10 show top and side views of the pump inlet check valve.

The pump further includes "outside" air inlet means in the form of (i) a stepped bore or port 32A in cylinder head 32 and (ii) a reed-type intake check valve 32B adapted to admit air into the pump cylinder during the intake stroke and to prevent airflow during the compression stroke. The reed-type intake check valve 32B is shown in FIGS. 2 and 6 and in greater detail in FIGS. 9 and 10 and comprises a generally flat, thin plate 32BB made from a suitable material such as a hard tempered 301 stainless steel strip 0.003 inches thick. Valve plate 32BB (see FIG. 9) has a generally square plan view shape with screw holes 32" in the four corners through which pass the screws 32' which hold the cylinder head 32 to frame portion 11AP, as aforesaid.

Figure 10:
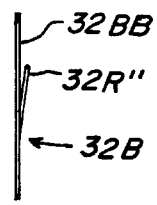

Valve plate 32BB further includes a centrally positioned reed 32R having a tongue 32R" shown in FIGS. 6 and 10 in its displaced position, i.e., when air is admitted during the intake stroke. As soon as the air stops flowing through the opening in 32B caused by the deflection of tongue 32R", the reed 32R will spring back to its "at rest" position against the cylinder head 32 (FIG. 6).

A small diameter port or bore 32P (see FIG. 9) through the plate 32BB co-acts with and is part of an outlet or discharge means described below.

Figure 2A:
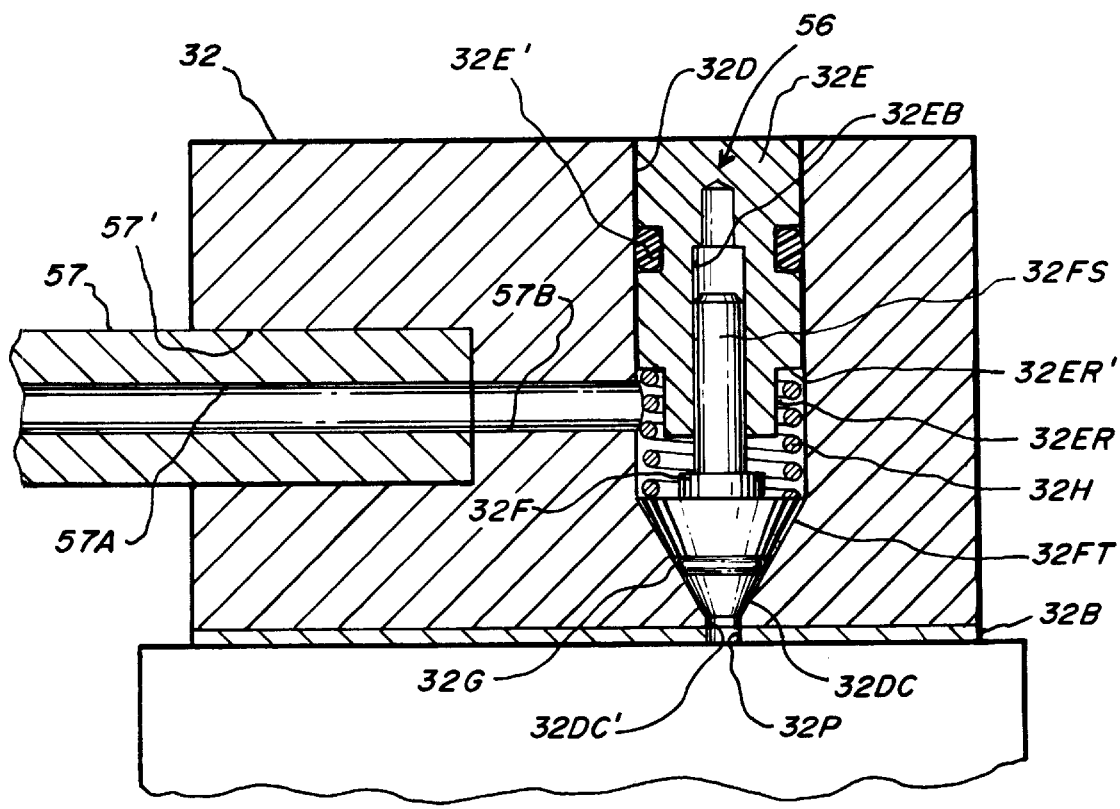
FIG. 2A is a cross-section of the discharge port means.

A discharge air hose fitting 57, shown in FIGS. 2, 2A and 6, is mounted on and integral with the cylinder head 32. More specifically, the fitting 57 is pressed into a bore 57' of cylinder head 32 and has a central bore 57A therethrough which is aligned with a bore 57B which extends to and connects with a bore 32D to be described below.

A discharge check valve means 56 is provided within a bore 32D of cylinder head 32 as shown in FIG. 2 and, in larger scale, in FIG. 2A. The lower end of the bore 32D (as viewed in FIG. 2A) has a female cone configuration 32DC terminating in a small opening 32DC' which is aligned with and is approximately the same diameter as bore 32P (see FIG. 9) of the check valve 32B. The check valve 56 comprises a cylindrically shaped valve guide 32E fixed in bore 32D; an "O" ring seal 32E' is positioned in a circumferential groove of guide 32E (as shown in FIG. 2A) to prevent air leakage. The valve guide 32E also has a central longitudinal bore 32EB opening at the bottom (as shown) and a reduced diameter bottom end 32ER, a shoulder 32ER' being defined at the top end of 32ER.

The check valve means 56 of FIG. 2A also includes a check valve 32F which has an upper shank portion 32FS which is slidably positioned in bore 32EB and a lower conically shaped nose portion 32FT which fits into and complements the female cone 32DC and also has a circumferential groove for receiving an "O" ring 32G. A coil spring 32H is positioned between the shoulder 32ER' and the upper or top surface of the nose portion 32FT to spring bias the conical nose of 32FT against the matching or complementary conical surface 32DC of bore 32D, the "O" ring 32G providing a fluid-tight seal, all as shown in FIG. 2A.

As indicated, the discharge port means 57 further include bore 57A and a bore 57B (aligned therewith) which extend through cylinder head 32 to intersect bore 32D at a point adjacent to bottom 32ER of the valve guide 32E.

During the compression stroke, the cylinder air pressure will build up and exceed the line pressure, the pressure differential will force the check valve 32F upwardly (from the closed position shown in FIG. 2A) over powering the biasing spring 32H and air then will exit the cylinder via the lower part of bore 32D, bore 57B and bore 57A of fitting 57 and thence flow to the load apparatus.

During the intake stroke, the nose 32FT is held firmly against the conical surface 32DC by the spring 32H and the discharge (or line pressure).

Figure 7:
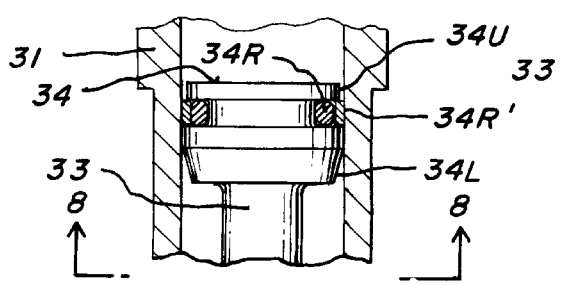
FIG. 7 is a view of part of the piston in the cylinder and FIG. 8 is a cross-section of FIG. 7 as viewed along section lines 8—8 thereof.
Figure 8:
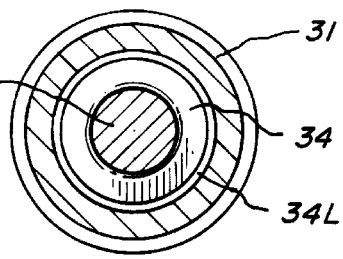

As indicated, the piston head is reciprocated within the cylinder 31 by the described mechanism including the rocker arm 43 ball 39 connection to the end 35 of the piston rod 33. This mechanism is designed so that, when the rocker arm 43 is at its closest point to the cylinder head, the top of piston 34 is parallel to the cylinder head, i.e., the piston rod axis and the center of ball 39 are aligned with the cylinder axis 31'. At all other piston positions, the center of ball 39 is displaced from the axis 31'; this causes some "rocking" of the piston rod and piston head with respect to axis 31' and this is permitted by the top and bottom of the piston having a reduced diameter 34U and 34L as shown in FIG. 7.

At start up the top of piston 34 may actually engage the cylinder head; this is not damaging because the shock absorber 46 in the drive mechanism will absorb the motion. In fact, this feature of my invention tends to assure that there will be only a minute amount of air remaining between the piston and the cylinder head when the piston has completed the compression stroke.

OPERATION

Assuming that motor 23 is energized, then the shaft 18 will be rotating at a relatively constant angular velocity all as aforesaid. Roller 28, supported by the rotating crank arm 25, will be periodically coming into contact with the lower or under surface of shock pad 46 bonded to the lower surface of rocker arm 43. As described, rocker arm 43 is at all times in engagement with the other end 35 of the piston rod through the medium of the ball 39 being positioned between recess 40 of the rocker arm and recess 35' of the piston rod. The spring means 37 biases the piston rod against the ball 39 and thus against the rocker arm 43. The amount or extent of intake travel of the piston rod is controlled by the position of the rocker arm about axis 44' which in turn is controlled by the position of the eccentric 49, all as described above. Thus rotation of shaft 18 causes periodic contact by roller 28 with the shock pad 46 to thereby periodically move the rocker arm 43 toward the cylinder and to thereby transmit force to the piston rod to thereby move the piston head periodically toward the cylinder head (compression stroke) against the biasing force of the spring 37 to thereby compress air in the cylinder (admitted by check valve 32B on the preceding intake stroke). The adjusting means 49 can be adjusted to anyone of many pre-selected settings to adjust the extent of the piston intake stroke to thereby adjust the volume of air admitted into the cylinder during the piston intake stroke and thus vary the volume of air pumped by said pump during the pump compression stroke, the pumped air being discharged through the outlet port means 57.

The eccentric 49 may be rotated, as aforesaid, by first loosening screw 58. In some cases, eccentric 49 will be set and calibrated at the factory so that the output of the pump will be a pre-selected volume. In other cases, eccentric 49 may be manually reset by an operator at a field location.

It will be understood that the described invention has the advantages of being a constant speed, variable volume air pump characterized by always having minimal clearance between the cylinder head and the top surface of the piston head upon completion of the compression stroke for all of the variable volume modes of operation, i.e., for the pre-selected various limits to the piston intake stroke. The flow rate or volume of air pumped for the case depicted in FIG. 6 will be much less than that for the case depicted in FIG. 2, but, in both cases, the top surface of the piston head will be immediately adjacent to the cylinder head upon completion of the compression stroke. Thus, the present invention provides a variable volume air pump which is especially well suited for soft ice cream machine applications. The aforesaid problems of the prior art pumps are thus avoided.

I claim:

1. An air pump comprising:

a) a frame;

b) a shaft rotatably supported by said frame for rotation about a shaft axis and means for rotating said shaft;

c) crank arm means fixed to said shaft so as to rotate therewith;

d) a pump cylinder supported by said frame, having a cylinder head and a cylinder body depending therefrom along a cylinder axis;

e) a piston rod having a piston head at one end thereof positioned in said cylinder for relative reciprocation therewith along said cylinder axis, said piston head having a continuous top surface, said top surface being closely adjacent to said cylinder head upon completion of a compression stroke, and said piston rod having at its other end means for receiving force tending to move said piston head toward said cylinder head;

f) spring means connected between said frame and said piston rod for biasing said piston head away from said cylinder head;

g) piston rod engagement means:
  (i) rotatably mounted on said frame for movement relative to said cylinder axis,
  (ii) positioned to engage said other end of said piston rod whereby said piston rod engagement means is biased, by said force of said spring means, to move away from said cylinder head and,
  (iii) being further positioned so as to be contacted by said crank arm means;

h) adjusting means for selectively varying the extent of movement of said piston rod engagement means away from said cylinder head to thereby vary the intake stroke travel of said piston rod;

i) intake check valve means adapted to:
  (i) admit air into said pump cylinder during the intake stroke, and
  (ii) prevent airflow therethrough during the compression stroke; and j) outlet port means including discharge check valve means located in said cylinder head, whereby each rotation of said shaft causes contact by said crank arm means with said piston rod engagement means to thereby periodically move said piston rod engagement means toward said cylinder head and thereby transmit force from said piston rod engagement means to said piston rod to thereby periodically move said piston head toward said cylinder head against the biasing force of said spring to thereby compress air in said cylinder admitted by said intake check valve means, and whereby, further, said adjusting means may be adjusted to a pre-selected condition to adjust the extent of the piston intake stroke travel to thereby adjust the volume of air admitted into said cylinder during the piston intake stroke and thus vary the volume of air pumped through said discharge check valve means during the compression stroke.

2. Apparatus of claim 1 further characterized by said piston rod engagement means comprising a rocker arm pivotally mounted on said frame.

3. Apparatus of claim 2 further characterized by shock absorption means being provided on said rocker arm at the location of said contact by said crank arm means.

4. Apparatus of claim 3 further characterized by said adjusting means comprising eccentric means rotatably mounted on said frame, having a pre-selected eccentricity, positioned to be in engagement with said rocker arm so as to limit the movement of said rocker arm away from said cylinder heads, and means for selectively locking said eccentric means to said frame at any of a plurality of pre-selected angular positions about its rotational axis to thereby have respective pre-selected portions of said eccentric means engage said rocker arm to thereby limit the intake stroke of said piston rod to a plurality of pre-selected positions.

5. Apparatus of claim 4 further characterized by means for providing a visual indication of the angular position of said eccentric means with respect to said frame.

6. Apparatus of claim 5 further characterized by said visual indication means comprising an indicia scale bonded to said eccentric means and a pointer mounted on said frame adjacent to said scale.

7. Apparatus of claim 6 further characterized by said rocker arm and said eccentric means being rotatably mounted on said frame for rotation about axes parallel to said shaft axis.

8. Apparatus of claim 2 further characterized by said rocker arm being mounted on said frame for rotation about an axis parallel to said shaft axis.

9. Apparatus of claim 3 further characterized by said crank arm means comprising a roller rotatably mounted on an end of a crank arm for rotation about an axis parallel to said shaft axis, whereby said roller periodically contacts said shock absorption means.

10. Apparatus of claim 3 further characterized by the geometry of the means to reciprocate said piston in said cylinder is such that, at the end of the compression stroke, the face of the piston head is parallel to and in contact with the adjacent face of the cylinder head, the said contact of said piston head with said cylinder head being cushioned by said shock absorption means.

11. Apparatus of claim 1 further characterized by said cylinder axis being substantially perpendicular to shaft axis.

12. Apparatus of claim 1 further characterized by said discharge check valve means permitting air flow from said cylinder during the compression stroke and to prevent air flow into said cylinder during the intake stroke.

13. Apparatus of claim 1 further characterized by said crank arm means comprising a roller rotatably mounted on an end of a crank arm for rotation about an axis parallel to said shaft axis, whereby said roller periodically contacts said piston rod engagement means.

14. Apparatus of claim 1 further characterized by said air pump having only a minute amount of expandable air in the cylinder at the start of the intake stroke.

15. Apparatus of claim 1 further characterized by the volume of air discharged during the compression stroke being constant independent of the discharge pressure.

16. Apparatus of claim 1 further characterized by the means to reciprocate said piston in said cylinder functioning such that, at the end of the compression stroke, the face of the piston head is parallel to the adjacent face of the cylinder head and are in near contact with each other.

* * * * *